(12) United States Patent
Fredericks et al.

(10) Patent No.: US 6,347,334 B1
(45) Date of Patent: Feb. 12, 2002

(54) SELF-DESCRIPTION EXTENDED LINK SERVICE FOR NETWORKS

(75) Inventors: Kenneth J. Fredericks, Boulder; Michael E. O'Donnell, Westminster, both of CO (US); Joseph C. Elliott, Hopewell Junction, NY (US)

(73) Assignee: McData Corporation, Broomfield, CO (US)

( * ) Notice: Subject to any disclaimer, the term of this patent is extended or adjusted under 35 U.S.C. 154(b) by 0 days.

(21) Appl. No.: 09/225,949

(22) Filed: Jan. 6, 1999

(51) Int. Cl.[7] .......................... H04L 12/24; H04L 12/26
(52) U.S. Cl. ...................... 709/220; 709/223; 709/230; 370/244; 370/248; 370/250
(58) Field of Search .................................. 709/220, 221, 709/222, 223, 224, 230; 710/10, 104; 370/241, 244, 245, 250, 248

(56) References Cited

U.S. PATENT DOCUMENTS 5,408,618 A * 4/1995 Aho et al. .................. 710/104
5,805,924 A * 9/1998 Stoevhase .................... 710/11

* cited by examiner

Primary Examiner—Dung C. Dinh
(74) Attorney, Agent, or Firm—Stuart T. Langley, Esq.; William J. Kubida, Esq.; Richard Bachand, Esq.

(57) ABSTRACT

A method for implementing a link level service in a computer network having a first port device and a second port device. Node identification data is stored in the second port device. A physical-layer communications coupling is provided between the first port device and the second port device which may be a point-to-point, loop, or switched circuit connection. The first port device sends a request node identification (RNID) message addressed to the second port device. The second port device creates an accept message and copies stored node identification data into the accept message. The second port device sends the accept message to the first port device.

21 Claims, 3 Drawing Sheets

SELF-DESCRIPTION EXTENDED LINK SERVICE FOR NETWORKS

BACKGROUND OF THE INVENTION

1. Field of the Invention

The present invention relates, in general, to network data communications, and, more particularly, to an extended link service that provides node identification data on request on a fibre channel fabric.

2. Relevant Background

Fibre Channel is a high performance serial interconnect standard designed for bi-directional, point-to-point communications between servers, storage systems, workstations, switches, and hubs. It offers a variety of benefits over other link-level protocols, including efficiency and high performance, scalability, simplicity, ease of use and installation, and support for popular high level protocols.

Fibre channel employs a topology known as a "fabric" to establish connections (paths) between ports. A fabric is a network of one or more switches for interconnecting a plurality of devices without restriction as to the manner in which the switch can be arranged. A fabric can include a mixture of point-to-point and arbitrated loop topologies.

In Fibre channel a path is established between two nodes where the path's primary task is to transport data from one point to another at high speed with low latency, performing only simple error correction in hardware. The Fibre channel switch provides flexible circuit/packet switched topology by establishing multiple simultaneous point-to-point connections. Because these connections are managed by the switches or "fabric elements" rather than the connected end devices or "nodes", fabric traffic management is greatly simplified from the perspective of the device.

To connect to a fibre channel fabric, devices include a node port or "$N_{13}$ Port" that manages the fabric connection. The N_port establishes a connection to a fabric element (e.g., a switch) having a fabric port or F_port. Devices attached to the fabric require only enough intelligence to manage the connection between the N_Port and the F_Port. Fabric elements include the intelligence to handle routing, error detection and recovery, and similar management functions. Fabric elements provide these functions by implementing a variety of services. Although some basic services are required to be provided by all fibre channel devices, a wide variety of optional or extended services can be implemented to provide additional functionality.

The fibre channel structure is defined as a five layer stack of functional levels, not unlike those used to represent network protocols. The five layers define the physical media and transmission rates, encoding scheme, framing protocol and flow control, common services, and the upper level application interfaces. FC-0, the lowest layer, specifies physical characteristics of the media, transmitters, receivers and connectors. FC-1 defines the 8B/10B encoding/decoding scheme used to integrate the data with the clock information required by serial transmission techniques.

FC-2 defines the framing protocol for data transferred between ports as well as the mechanisms for using Fibre Channel's circuit and packet switched service classes and the means of managing the sequence of a data transfer. FC-2 is often referred to as the "link level". FC-3 is undefined and currently is not used. FC-4 provides integration of FC-2 level frames with existing standards and protocols such as FDDI, HIPPI, IPI-3, SCSI, Internet Protocol (IP), Single Byte Command Code Set (SBCCS), and the like.

Services can be readily provided at the FC-2 and FC-4 levels (or the FC-3 level when implemented). Each data packet sent between fabric elements includes a "header" that includes fields holding addressing and other packet-specific information. A certain number of codes are reserved in the header to identify packets that are providing services from packets that are transferring user-level data. Upon receipt of a packet having a recognized service code in the header, a receiving device knows that the payload data is not regular information traffic. If the receiving device offers the service specified by the code, it will execute routines to implement the service. If the receiving device does not offer the service specified by the code, it returns a packet to the sender with a header code indicating that the particular service is not supported. This system enables the variety of services offered by a particular device to be expanded so long as code space remains to uniquely identify each service.

"Self description" refers to the ability of a product to provide identifying information (e.g., node-identification data) on request at any of its interfaces. This ability allows, for example, an inventory of the products/nodes of a configuration can be assembled and maintained under program control. This information also enables the interconnections of the configuration to be determined. In prior fibre channel implementations, self description is not provided. Instead, a first node may obtain some limited information from a second node if such information is voluntarily or automatically provide by the second node. However, nodes had no way of prompting the other nodes in a fabric to provide self description information.

Specific uses of self-description information in a Fibre Channel environment include enabling a node to determine whether the actual configuration at initialization matches a predefined configuration. Fibre channel is intended to be a flexible, robust network that allows devices to be added, removed, repaired, and upgraded with minimal impact to ongoing communication services. Each device stores a predefined description of nodes that it expects to be coupled to the fabric so that it knows addresses and device types of other nodes. However, this stored description may become out of date as the fabric changes. A need exists for a quick, readily implemented method that enables devices to update their stored node description information to match the existing fabric to which they are connected.

Similarly, after a link disruption or malfunction such as loss-of-light on the link interface, the node desirably determines whether the restored configuration matches the configuration that existed before the disruption or malfunction. Further, self-description information provides unique identification of failing nodes under program control. These useful functions could not be fully provided in prior implementations that failed to provide self description information.

SUMMARY OF THE INVENTION

Briefly stated, the present invention involves an extended link service (ELS) for Fibre channel fabrics which supports the acquisition of self-description information. Self Description provides product dependent information (e.g., node-identification data) to compatible FC-2 or FC-4 facilities in all classes of service. In a preferred implementation, the ELS frames implementing the present invention is transmitted using the FT-1 frame format via Class 2, Class 3, or Class F service.

More specifically, the present invention involves a method for implementing a link level service in a computer network having a first port device and a second port device. Node identification data is stored in both the first port device and the second port device. A physical-layer communications coupling is provided between the first port device and the second port device which may be a point-to-point, loop, or switched circuit connection. The first port device sends a request node identification (RNID) message addressed to the second port device. The second port device creates an accept message and copies stored node identification data into the accept message. The second port device sends the accept message to the first port device. In a similar manner, the second port device sends a request node identification (RNID) message addressed to the first port device. The first port device creates an accept message and copies stored node identification data into the accept message. The first port device sends the accept message to the second port device.

DETAILED DESCRIPTION OF THE PREFERRED EMBODIMENTS

"Self description" is the ability of a product to provide identifying information, referred to herein as "node-identification data" on request at any of its interfaces. Self description differs from data that is automatically provided by a device periodically or upon startup in that self description data is provided in response to an external request. The present invention also includes improvements that enable products to request, store and use the node identification data when retrieved. This ability serves a number of purposes, including, but not limited to, the following:

assembling and maintaining an inventory of the products and/or nodes of a fabric configuration under program control;

determining the interconnections of the fabric configuration;

determining whether the actual configuration at initialization matches a predefined configuration;

determining, after a link disruption or malfunction such as loss-of-light on a fiber optic link interface, whether the restored configuration matches the configuration that existed before the disruption; and providing unique identification of failing nodes under program control.

The present invention is usefully described and understood in terms of a request-reply protocol and exemplary data formats used to implement the request-reply protocol in a fibre channel FC-2 level (i.e., link-level) implementation. It should be understood that any particular implementation will allow a wide latitude in constructing the data packet format and the particular information that is provided in the node identification data.

The present invention is described in terms of an implementation using an FC-2 extended link service (ELS) sequence which is believed to be the most useful implementation of the present invention. An alternative implementation of the present invention involves using the specified fiber channel layer four (FC-4) link service request and reply protocols for the RNID request and accept messages. In this case, the FC-PH Header fields comprise an R_CTL field set to hex '32' for request frames, hex '33' for reply frames, and the type field set to hex '18' in a particular implementation to indicate an SBCCS frame type. The remaining fields are set to values indicated in the description of the FC-2 extended link service implementation.

Figure 1:
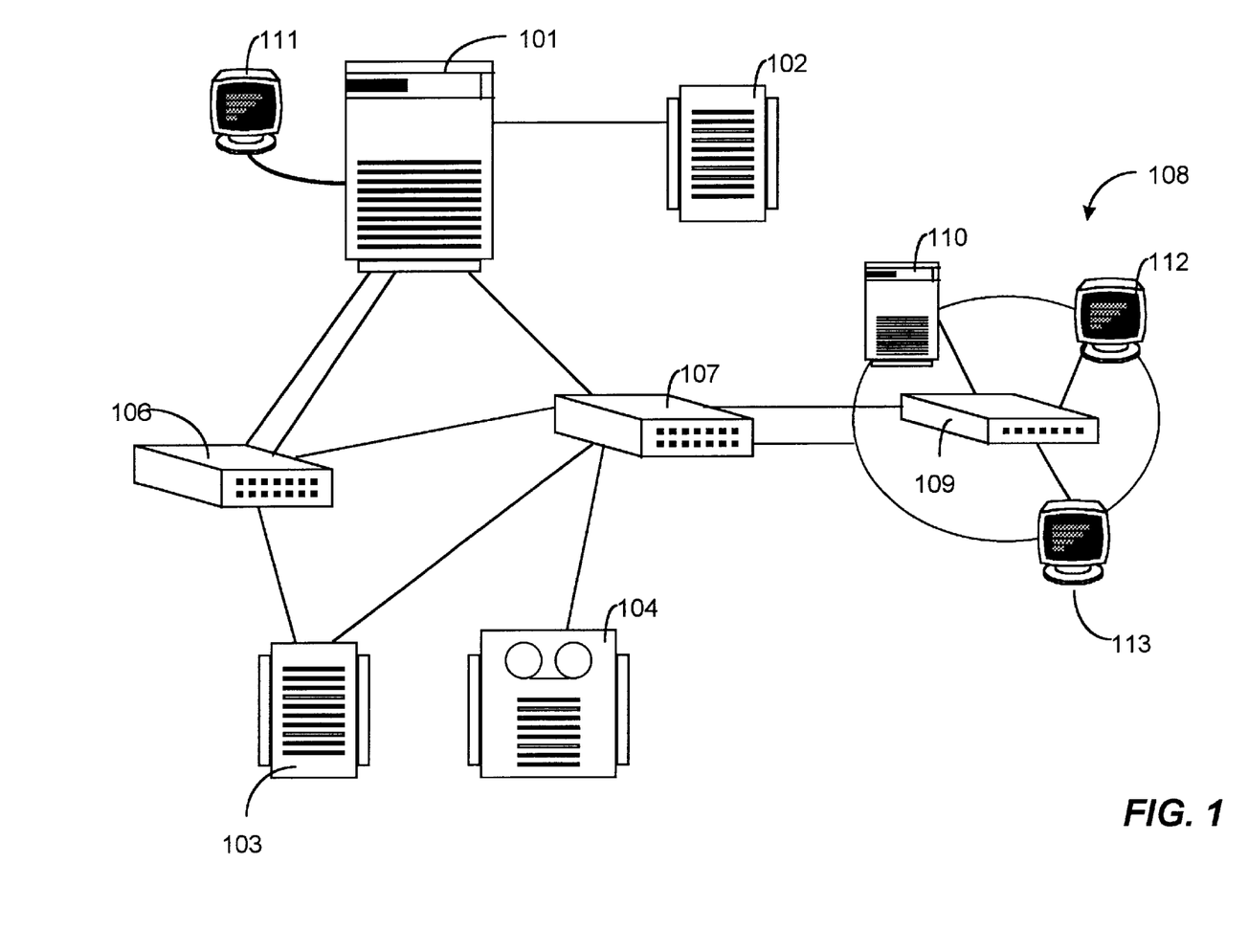
FIG. 1 shows a generalized fibre channel environment implementing the method and systems in accordance with the present invention.

FIG. 1 shows a generalized fibre channel environment implementing the method and systems in accordance with the present invention. FIG. 1 illustrates a number of devices and connections between the devices indicated by connecting lines. Each device includes one or more ports. In fibre channel, these ports are generally classified as node ports (N_Ports), fabric ports (F_Ports), and expansion ports (E_Ports). Node ports are located in a node device such as server 101, disk arrays 102 and 103, and tape storage device 104. Fabric ports are located in fabric devices such as switch 106 and switch 107. Optionally, an arbitrated loop network 108, can be linked to the fabric using fabric arbitrated loop ports (FL_Ports).

A path can be established between two N_Ports such as the path between server 101 and disk array 102 shown in FIG. 1. In this case, each N_Port manages the point-to-point connection between the other device's N_Port. A circuit-switched path can also be provided using a switch 106 or 107. For example, the N_Port in server 101 can establish a path with the N_Port of disk array 103 through switch 106. In this case, each N_Port makes a connection to an F_port in switch 106. Switch 106 also includes an expansion port or E_Port that enables a path to another E_Port in switch 107. Using an inter-switch link (ISL) (i.e., a link between switches) enables each N_Port to couple to each other N_Port in the fabric through one or more paths. Switch 107 also includes a fabric loop port (FL_Port) that supports a link to arbitrated loop 108. Devices 111, 112, and 113 represent user terminals, personal computers, or workstations coupled to the fabric through a conventional direct or network connection.

In accordance with the present invention, one or more of the ports (e.g., N_Ports, F_Ports, E_Ports, L_Ports, and the like) include an extended link service to request and/or supply self description data. The present invention can be implemented in a point-to-point topology illustrated by server 101 and device 102, or can be implemented in a circuit switched topology through switch 106 and/or switch 107. Similarly, devices within arbitrated loop 108 can implement the ELS in accordance with the present invention to request and supply self description information with any other device shown in FIG. 1. Loop 108 includes L_Ports supporting links between server 110, workstation 112, and workstation 113, as well as a FL_Port supporting a link to switch 107. Hub 109 includes N_Ports supporting links to server 110 and workstations 112 and 113, as well as an FL_Port supporting a link to switch 107.

Figure 2:
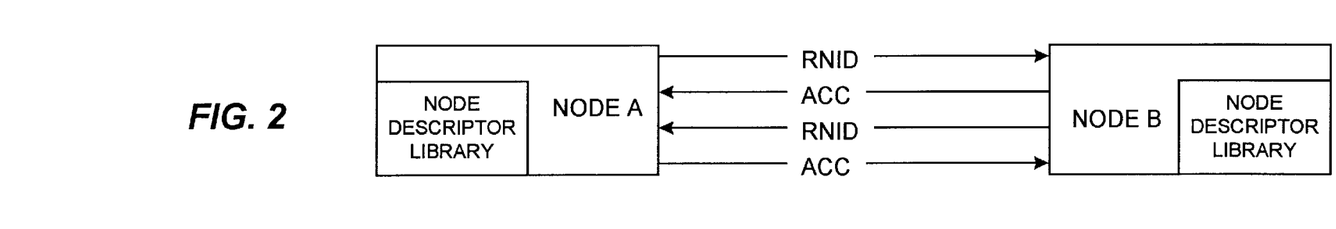
FIG. 2 illustrates in block diagram form the information exchanges involved in the self-description ELS protocol in accordance with the present invention.

FIG. 2 illustrates in block diagram form the information exchanges involved in the self-description ELS protocol in accordance with the present invention. Node A and Node B may be implemented in any device shown in FIG. 1 or their equivalent. Each N_Port (and F_Port, L_Port or E_port if desired) includes a node descriptor database, that stores node identification data returned from other devices. The node descriptor library is implemented as a writeable hardware or software data structure. In accordance with the present invention, Node A issues a "request node identification" (RNID) message, preferably using the FT-1 frame format via Class 2, Class 3, or Class F service. Assuming Node B also implements the self description ELS in accordance with the present invention, Node B responds to the RNID by returning an accept message. In accordance with the present invention, the payload of the accept message includes node identification data. If Node B does not support the self description ELS it returns a reject message in accordance with existing Fibre Channel link service protocol.

Any node may implement the ELS in accordance with the present invention. As shown in FIG. 2, Node B follows the above described protocol to obtain node identification data from Node A. Hence, Node B transmits the RNID to Node A, and Node A responds with an accept message (or reject message if Node A does not support the self description ELS).

In a specific example, header fields of the standardized FT-1 frame format include the following fields and settings to implement the ELS frame in accordance with the present invention:

TABLE 1

| Field | Field Description | Field setting |
|---|---|---|
| R_CTL | Routing Control | This field is set to hex '22' for request frames, and to hex '23' for Accept reply frames |
| CS_CTL | Class Specific Control | This field is set to hex '00'. |
| S_ID | Source ID | This field is set as indicated for the specific source node involved. |
| D_ID | Destination ID | This field is set as indicated for the specific destination node involved. |
| TYPE | Data Structure Type | This field is set to hex '01' indicating Extended Link Service. |

The specific settings shown in Table 1 are exemplary values only and any available hex code values may be used. All other fields are set as appropriate according to the rules defined in the FC-PH standard. The first word in the payload specifies the Command Code.

It is contemplated that the present invention will be implemented as an optional Extended Link Service and may be usefully applied to operation of a fabric or point-to-point connection. The ELS in accordance with the present invention is implemented by N_Ports and fabrics that comply with the optional self-description function described herein.

Nodes that support the self description ELS in accordance with the present invention and that desire to obtain self description information from other devices connected to the fabric implement a "Request Node-Identification Data" (RNID) function. The RNID function is essentially implemented by transmitting a RNID ELS message 300, shown in FIG. 3 and as described in greater detail hereinbelow. The RNID message preferably indicates a specific FC-4 frame format in which the requesting node has interest.

Figure 4:
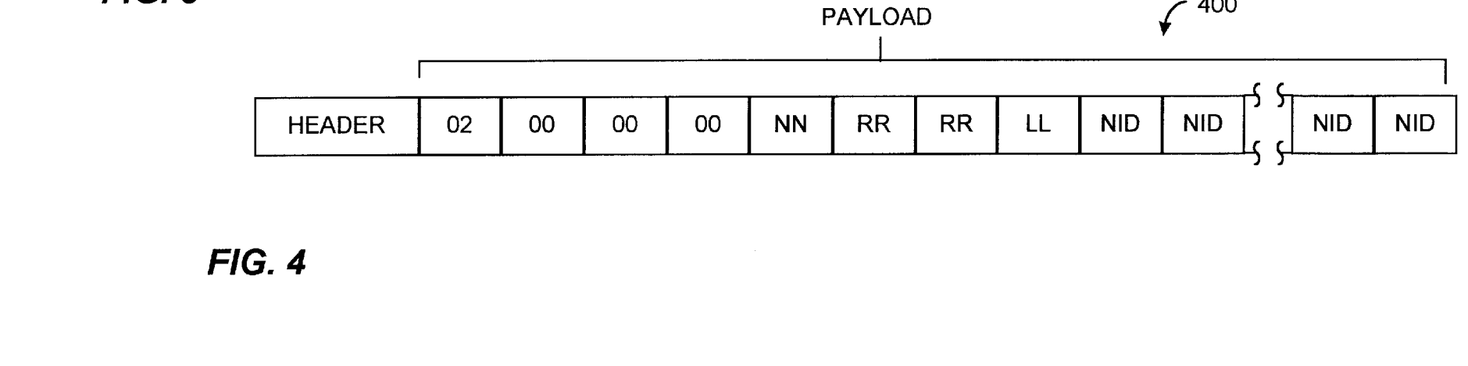
FIG. 4 shows an exemplary response message format in accordance with the present invention.

Recipient devices that include the self-description ELS functionality in accordance with the present invention respond to the RNID with an "Accept" (ACC) ELS reply by transmitting an Accept message 400, shown in FIG. 4, that includes node-identification data in its payload. The preferred implementation is an optional addition to conventional N_Ports and so accommodation should be made to account for other fabric N_Ports that do not elect to support the ELS in accordance with the present invention. If the recipient device does not support the self-description ELS, it will by default reply with a "link service reject" (LS_RJT) ELS message with a reason code of "command not supported" (or the equivalent) as defined by the Fibre Channel FC-2 protocol.

As described hereinbefore the RNID can optionally request node information from only nodes that support a specific FC-4 frame format (e.g., SCSI, SBCCS, and the like). In this way, the requesting device will not receive Accept message responses from devices that are not of interest. The ELS implementation preferably allows that if the recipient device does not support the requested node-identification data format specified in the RNID message , it should reply with a "link service reject" (LS_RJT) ELS message with a reason code of "unable to perform command request" and reason-code explanation of "unable to supply requested data".

In a preferred implementation, a RNID message is sent by an N_Port to its nearest neighbor node. The node attached to the other end of the link is hereinafter referred to as the "nearest neighbor node" and may be a node port (N_Port) of another device or a fabric port (F_Port). It is permissible, however, for a node to request node-identification data from any other node in the fabric. If the nearest neighbor node has been determined from the fabric logon information (FLOGI) to be a fabric node, then the RNID ELS message is sent to the Fabric Controller at the address hex 'FFFFFD' as is well known. If the nearest neighbor node has been determined from the FLOGI to be an N_Port, then the RNID ELS is sent directly to that N_Port identified by its address identifier.

The fabric may acquire the node-identification data for all nodes attached to a switch's E_Ports, FL_Ports, or E_Ports with the address identifier of the attached node. Multiple switches in the same fabric may acquire the node-identification data of the node attached to the other end of their inter-switch link (ISL). For node-identification data acquisition between E_Port nodes, each switch 106 and 107 may issue and respond to RNID ELS messages across the ISL using Class F service (i.e. the ELS inherently becomes a switch fabric internal link services (SW_ILS)).

When the recipient device supports the self description ELS in accordance with the present invention, it reports the requested node-identification data in the payload of the Accept reply message 400. This protocol requires one request message and one reply message only and so minimizes traffic overhead. The "upper level protocol" or ULP of the requesting N_Port will obtain this node-identification data and use it to authenticate system configurations. In addition, the node-identification data may be used in generating and coordinating link-incident reports that handle errors or faults occurring in the link as described in copending U.S. patent application Ser. No. 09/225,521 (now U.S. Pat. No. 6,115,361) by the inventors of the present invention and assigned to the assignee of the present application.

Figure 3:
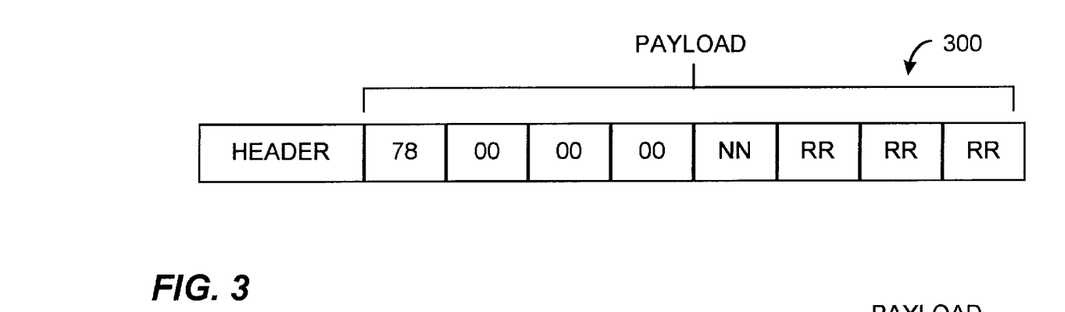
FIG. 3 illustrates an exemplary request message format in accordance with the present invention.

FIG. 3 shows an exemplary format of the RNID request message 300. Each RNID message 300 includes a conventional header format with field values set as described herein in reference to Table 1. In the payload, four bytes contain the value hex '78 00 00 00' which identifies the message as an ELS frame in accordance with the present invention. A single byte is used to indicate node-identification data format indicated by "NN" in FIG. 3. In a particular implementation, the value hex "00" in the NN field indicates that no specific node-identification-data format is specified. In this case, each receiving node, regardless of the format type supported by that node, will report its self description information (if it supports the ELS in accordance with the present invention). The format values hex 01 through hex FF each indicate a specific FC-4 device type as defined in the FC-4 specification. For example, a node-identification-data format for FC-4 Device Type SBCCS is implemented by a hex '18' in the NN field. Three bytes are reserved as indicated by the RR designated fields in FIG. 3.

FIG. 4 shows an exemplary format of the Accept response message 400. Each Accept response message 400 includes a conventional header format with field values set as described herein in reference to Table 1. When a device does not support the ELS in accordance with the present invention, the reply includes a link service Reject (LS_RJT) that signifies the rejection of the RNID request.

When a device supports the ELS in accordance with the present invention, the reply includes an Accept (ACC) message that signifies acceptance of the RNID request. FIG. 4 illustrates an Accept message that presents node-identification data. In the payload, four bytes contain the value hex '02 00 00 00' which identifies the frame as an accept ELS message in accordance with the present invention. A single byte is used to indicate node-identification-data format indicated by "NN" in FIG. 4. In a particular implementation, the NN field must be specified in the Accept message 400 to indicate which node-identification-data format is specified, hence the hex "00" designation is reserved (not used). The format values hex 01 through hex FF each indicate a specific FC-4 device type as defined in the FC-4 specification. Two bytes are reserved as indicated by the RR designation in FIG. 4.

One byte, labeled LL in FIG. 4, is used to indicate the length in bytes of the node-identification-data payload. In a particular implementation, this value does not include word 0 and word 1 of the Accept message. In the example, this byte length is a multiple of four, and is dependent on the node-identification-data format. The minimum value of this field is four bytes and the maximum value of this field is 120 bytes in a particular implementation. The minimum and maximum values can be varied, as agreed upon, to meet the needs of a particular application.

The bytes labeled NID in FIG. 4 include the node identification data. The format of the node-identification data field is dependent on the FC-4 Device Type, and the particular content and format is a matter of design choice selected based upon the particular ULP and the intended usage in a particular application. For a specific FC-4 device type's node identification data, the ULP selects a set of product-identifying information parameters. The ULP defines the format, fields used, and size of the parameters from the broad guidelines outlined in Table 2.

TABLE 2

| Field | Field Description |
| --- | --- |
| Flags | Description of the manner in which node identification data fields are to be interpreted. |
| Node-Type | Indication of the type of node described by the corresponding node identification data. |
| Node-Parameters | Additional classification information and ULP interface identification about the node-type. |
| Type-number | Product type number |
| Model number | Model number of a product |

TABLE 2-continued

| Field | Field Description |
| --- | --- |
| Manufacturer | Information that identifies a manufacturer of the product |
| Plant of manufacture | Information that identifies a plant or location at which the product was manufactured. |
| Sequence Number | A multicharacter sequence number of the product such as a manufacturer's serial number. |
| Tag | Additional physical interface information about the product. |

An example of a flag is a validity flag that indicates the validity of the information contained in the node identification data. An example of node parameter information includes identifying the node as a channel-subsystem, disk, tape, printer, or the like. The tag field contains data indicating, for example, a physical address identifier for the product's interface (that is identified in the node-parameters field) in the case of an SBCCS node. The contents of each of these fields is quite flexible and can convey the information required by or desired by other devices in a fabric.

In operation, an N_Port implementing the present invention attempts to acquire node-identification data by sending a RNID ELS message as soon as the N_Port has determined its address identifier and service parameters. The recipient N_Port implementing the present invention responds with an Accept (ACC) ELS message containing the node-identification data in its payload. The requesting node saves the returned node-identification data in its node descriptor database library. During normal operation the node identification data need not be exchanged again.

When a condition occurs that causes regression into the login (e.g., FLOGI or PLOGI) portion of the initialization process for the nearest neighbor node, the N_Port may discard the stored node-identification data or may consider the stored node-identification data to be no longer current. When conditions permit, the N_Port desirably attempts to acquire the current node-identification data of the attached node by executing the ELS in accordance with the present invention again.

When the ULP does not require the information contained in the node-identification data, the N_Port is permitted to continue ULP processing, if appropriate, even if the attempt to acquire the node-identification data of its neighbor was unsuccessful. An unsuccessful attempt to acquire valid and current node-identification data and the affect on subsequent ULP processing is a matter of design choice selected to meet the needs of a particular application. A retry attempt to acquire the node-identification data may be deferred for a link error, a reject condition (P_RJT or F_RJT), or a busy condition (P_BSY or F_BSY), or no response after some timeout period.

In some applications it may be desirable for a node to require valid and current node-identification data before communicating with a particular node. This might be required for example, in certain security applications. When the ULP requires the information contained in valid and current node-identification data of its neighbor and there is reason to expect that a retry will eventually be successful, the N_Port may retry node-identification data acquisition until valid and current node-identification data is acquired.

If an N_Port sends a RNID ELS message and receives a LS_RJT reply with a reason code of "command not supported", the ULP is notified to establish and store the node-identification data for that node with an indication of "not valid". If an N_Port sends an RNID ELS message and receives a LS_RJT reply with a reason code of "unable to perform command request" and reason-code explanation of "unable to supply requested data", the ULP may cause the N_Port to retry the RNID ELS in accordance with the present invention with a different node-identification-data format request, or establish the node-identification data with an indication of "not valid".

SPECIFIC EXAMPLE

By way of example, a specific implementation is described for an ELS request/reply between SBCCS type devices. The node-identification-data format for FC-4 device type SBCCS is hex '18'. Hence, the RNID message will resemble that shown in FIG. 3 with the NN field containing hex '18'. The header includes fields indicated in Table 1 and address information directing the RNID message to the desired port (N_Port, F_Port, E_Port, and the like).

An Accept reply packaged from the node to which the RNID is addressed will resemble that shown in FIG. 4 with header information as indicated in Table 1 addressed to the node issuing the RNID message. The NN field contains a hex '18'. The node-identification-data length for node-identification-data format FC-4 device type SBCCS is suggested to be 32 bytes, hence the LL field holds a hex value "20". One Accept message 400 is sent which includes 32 bytes of NID data.

Figure 5:
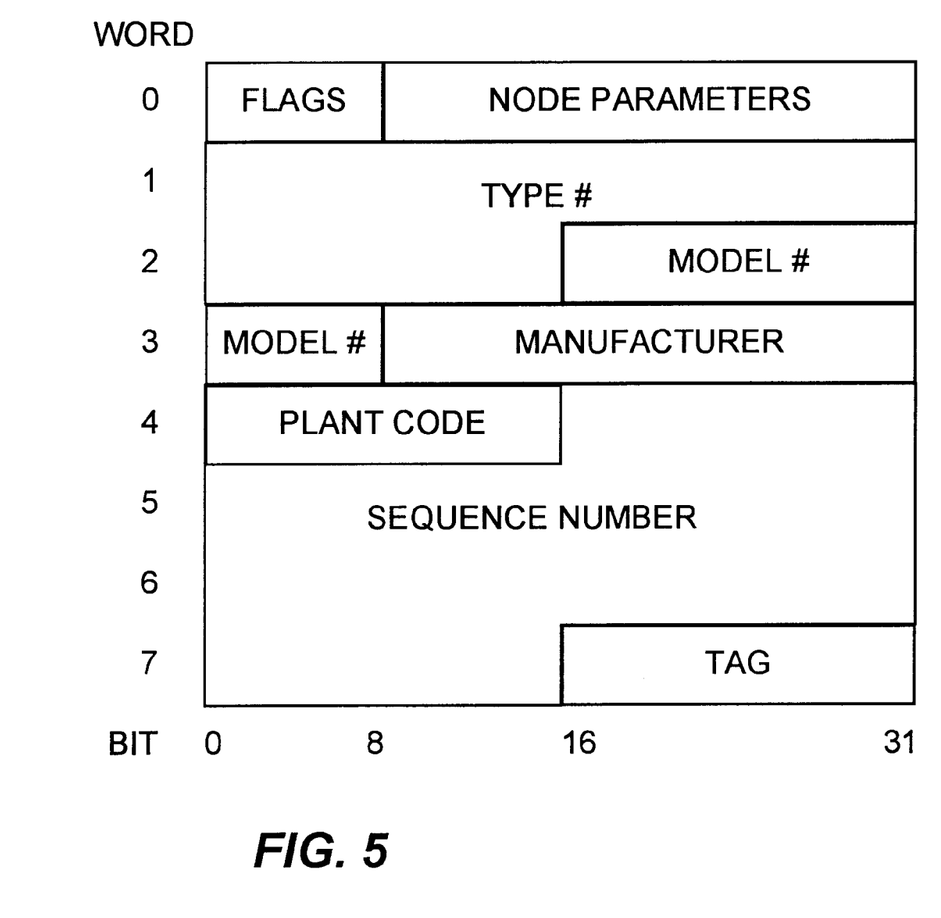
FIG. 5 shows a detailed example of a node identification data format in accordance with the present invention.

A suggested format of the node-identification data field for node-identification data format FC-4 device type SBCCS is shown in FIG. 5. For SBCCS, the 32 byte node-identification data is hereafter referred to as the "node descriptor". A node descriptor is a 32-byte field that describes a node. The node descriptor is returned in the node-identification data field provided in the Accept message. In FIG. 5, the horizontal axis represents a word number in the node descriptor information and the vertical axis represents a particular bit within the word. It should be understood that the particular example shown in FIG. 5 is suggested only by way of example to improve understanding, and is not a limitation of the present invention.

Flags: Byte 0 of word 0 describes the manner in which selected fields of the node descriptor are to be interpreted. The meaning of bits 0–7 is as follows:

TABLE 3

| bits # | Description |
| --- | --- |
| 0–2 | Node-Descriptor-validity: Bits 0–2 contain a three-bit code that describes the validity of the node descriptor contained in words 1–7. The codes and their meanings are as follows: <br> '0' Node-Descriptor is valid. <br> '1' Node Descriptor is valid, however, it may not be current. This value is used when the SDC has obtained the requested node descriptor of its nearest neighbor but subsequently has observed some event (such as the loss of signal on a link) which may have resulted in a configuration change. The SDC has been unable to obtain the node descriptor again. <br> '2' Node Descriptor is not valid. The SDC is unable to obtain the requested node descriptor. Except for the Node-Descriptor-validity field, the contents of the node descriptor has no meaning. |

TABLE 3-continued

| bits # | Description |
| --- | --- |
| 3 | Node-Type: When zero, bit 3 specifies that the node described by this node descriptor is a device-type node; when one, this node is a channel-subsystem-type (CSS-type) node. The setting of this bit provides the interpretation of Node-parameters. |
| 4–7 | Reserved |

Node-parameters: Bytes 1–3 of word 0 contain additional information about the node.

When bit 3 of the flag field is zero, indicating that this is a device-type node, the contents of bytes 1–3 of word 0 are, for example, as follows:

TABLE 4

| Byte | Description |
| --- | --- |
| 1 | Reserved. |
| 2 | Class: Byte 2 of word 0 contains an eight-bit code that specifies the class to which the device belongs. The codes and their meanings are as follows: <br> 0      Unspecified class <br> 1      Direct access storage (DASD) <br> 2      Magnetic tape <br> 3      Unit record (input) <br> 4      Unit record (output) <br> 5      Printer <br> 6      Communications controller <br> 7      Terminal (full screen) <br> 8      Terminal (line mode) <br> 9      Standalone channel-to-channel adapter (CTCA) <br> 10     Switch <br> 11     Protocol converter <br> 12–255   Reserved |
| 3 | Reserved |

When bit 3 of the flag field is one, indicating that this is a CSS-type node, the contents of bytes 1–3 of word 0 is as follows:

TABLE 5

| Byte | Description |
| --- | --- |
| 1 | Type: When the class field contains a value other then 4, this field is reserved and set to zeros. When the class field contains a value of 4, byte 1 of word 0 contains host-related side and partitioning-type information for the specified interface. The bits and their meanings are as follows: <br> - Bits 0–2 is reserved and set to zeros. <br> - Bit 3 contains a bit that identifies the host side. <br> The value of the bit directly reflects a numeric identifier of a host side. For example, a value of b'0' designates host-side 0. Likewise, a value of b'1' designates host-side 1. <br> All nodes which are part of the same host side have the same value. <br> - Bit 4, when zero, indicates that the CSS cannot be physically partitioned into more than one host side. Bit 4, when one, indicates that the host is capable of being physically partitioned into more than one side. <br> - Bit 5, when zero, indicates that the host has not been physically partitioned into more than one side; bit 5 shall always be zero if bit 4 is zero. Bit 5, when one, indicates that the host |

TABLE 5-continued

| Byte | Description |
|---|---|
| | has been physically partitioned into more than one side.<br>- Bits 6–7 are reserved and are set to zeros. |
| 2 | Class: Byte 2 of word 0 contains a code that specifies the class to which the interface belongs. The codes and their meanings are as follows:<br>0    Unspecified class<br>1    Channel path<br>2    Integrated channel-to-channel adapter (CTCA)<br>3    Reserved<br>4    Coupling-facility channel<br>5–255    Reserved |
| 3 | Identification: Byte 3 of word 0 contains the channel-path-identifier (CHPID) of the channel path that contains the specified interface. |

The contents of the following fields correspond to the information associated with the Self-Describing Component (SDC).

Type-number: Word 1 and bytes 0–1 of word 2 contain the six-character (0–9) ASCII type number of the SDC. The type number is right justified with leading ASCII zeros (x'30') if necessary.

Model-number: Bytes 2–3 of word 2 and byte 0 of word 3 contain, if applicable, the three-character (0–9 or uppercase A–Z) ASCII model number of the SDC. The model number is right justified with leading ASCII zeros (x'30') if necessary.

Manufacturer: Bytes 1–3 of word 3 contain a three-character (0–9 or uppercase A–Z) ASCII code that identifies the manufacturer of the SDC.

Plant-of-manufacture: Bytes 0–1 of word 4 contain a two-character (0–9 or uppercase A–Z) ASCII plant code that identifies the plant of manufacture for the SDC.

Sequence-number: Bytes 2–3 of word 4, words 5–6, and bytes 0–1 of word 7 contain the 12-character (0–9 or uppercase A–Z) ASCII sequence number of the SDC. The sequence number is right justified with leading ASCII zeros (x'30') if necessary. A serial number consists of the concatenation of the plant-of-manufacture designation with the sequence-number designation.

Tag: Bytes 2–3 of word 7 contain the physical identifier for the SDC interface that is identified by the preceding 26 bytes of the node descriptor.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for implementing a link level service in a computer network comprising the steps of:

providing a first port device;

providing a second port device;

storing node identification data in the first and second port device;

providing a physical-layer communications coupling between the first port device and the second port device;

causing the first port device to send a request node identification (RNID) message addressed to the second port device;

transporting the RNID message to the second port device using the communications coupling;

creating an Accept message in the second port device;

copying the node identification data stored in the second port device into the second port device's Accept message;

causing the second port device to send the accept message to the first port device; and transporting the accept message to the first port device using the communications coupling.

2. The method of claim 1 further comprising the steps of:

storing node identification data in the first port device;

causing the second port device to send a request node identification (RNID) message addressed to the first port device;

transporting the RNID message to the first port device using the communications coupling;

creating an accept message in the first port device;

copying the node identification data stored in the first port device into the first port device's accept message;

causing the first port device to send the accept message to the second port device; and transporting the accept message to the second port device using the communications coupling.

3. The method of claim 1 wherein the communications coupling comprises a fibre channel fabric and the step of transporting further comprises using an FC-4 layer protocol.

4. The method of claim 1 wherein the communications coupling comprises a fibre channel fabric and the step of transporting further comprises using an FC-2 layer protocol.

5. The method of claim 1 wherein the communications coupling comprises a fibre channel fabric and the step of transporting further comprises using an FT-1 transport layer protocol.

6. The method of claim 1 wherein the node identification data comprises product identification information related to a product in which the first and second port device is implemented and the method further comprises a step of making the product identification information available to the upper layer protocol (ULP) operating on the first and the second port device.

7. The method of claim 1 further comprising:

executing an upper layer protocol (ULP) operating on the first and second port device;

passing the node identification data to the ULP; and causing the ULP to store the node identification information in a configuration database.

8. The method of claim 7 further comprising:

causing the ULP to compare the NID to a saved system configuration to determine if a system configuration change has occurred.

9. The method of claim 7 further comprising:

causing the ULP to associate the node identification information with historical failure statistics for the second port device.

10. The method of claim 7 further comprising:

causing the ULP to use the node identification information to autoconfigure itself for communications with the second port device.

11. The method of claim 1 further comprising:

causing the first and second port device to repeat the step of sending the RNID message until valid and current node-identification data is acquired from the other port device.

12. The method of claim 1 wherein the RNID message includes a type field indicating an FC-4 device type and the step of creating an Accept message is performed only when the first and second port device are associated with the FC-4 device type indicated in the type field of the RNID message.

13. A system for communicating data comprising:

a first port device;

a second port device;

a data structure within the first and second port device storing node identification data;

a physical-layer communications coupling between the first port device and the second port device;

an upper layer protocol (ULP) operating on the first port device and causing the first port device to generate a request node identification (RNID) message addressed to the second port device;

a transmit device within the first port device and operative to receive and send the RNID message over the communications coupling;

a link-level facility operating in the second port device for receiving and recognizing the RNID message, creating an accept message addressed to the first port device, and copying the stored node identification data into the accept message; and a transmit device within the second port device and operative to receive and send the accept message over the communications coupling.

14. The system of claim 13 further comprising:

a data structure within the first port device storing the node identification data transmitted from the second port device.

15. The system of claim 13 wherein the communications coupling comprises a switch.

16. The system of claim 13 wherein the first port device comprises a fibre channel node port.

17. The system of claim 13 wherein the first port device comprises a fibre channel fabric port.

18. The system of claim 13 wherein the first port device comprises a fibre channel expansion port.

19. The system of claim 13 wherein the first port device comprises a fibre channel loop port.

20. The system of claim 13 wherein the RNID message includes a type field indicating an FC-4 device type and the link level facility is configured to create an accept message only when the second port device is associated with the FC-4 device type indicated in the type field of the RNID message.

21. In a network having at least a first computer having a first port device and a second computer having a second port device, a self-description apparatus for providing node identification data used to diagnose fibre channel network configuration within the apparatus being operative to implement a link level service in the network, comprising:

a first code portion data packet comprising code configured to cause the first computer to generate a request node identification (RNID) message addressed to the second computer, the RNID message indicating an FC-4 device type;

a second code portion data packet comprising code configured to cause the second computer to create an accept message in response to the RNID message when the second computer includes a device having the indicated FC-4 device type;

a third code portion data packet comprising code configured to cause the second computer to copy stored node identification data into the accept message; and a fourth code portion data packet comprising code configured to cause the second computer to send the accept message to the first computer.

* * * * *